(12) United States Patent
Akutsu et al.

(10) Patent No.: US 8,355,051 B2
(45) Date of Patent: Jan. 15, 2013

(54) ANTI-VIBRATION ACTUATOR, AND LENS UNIT AND CAMERA EQUIPPED WITH SAME

(75) Inventors: Toshinori Akutsu, Saitama (JP); Toshikuni Tateno, Saitama (JP)

(73) Assignee: Tamron Co., Ltd., Saitama (JP)

( * ) Notice: Subject to any disclaimer, the term of this patent is extended or adjusted under 35 U.S.C. 154(b) by 174 days.

(21) Appl. No.: 12/832,485

(22) Filed: Jul. 8, 2010

(65) Prior Publication Data

US 2011/0013029 A1 Jan. 20, 2011

(30) Foreign Application Priority Data

Jul. 14, 2009 (JP) ................................. 2009-165780

(51) Int. Cl.
*H04N 5/228* (2006.01)
*G03B 17/00* (2006.01)

(52) U.S. Cl. ...................................... 348/208.1; 396/52

(58) Field of Classification Search .. 348/208.1–208.11; 396/52, 53, 55, 75, 133
See application file for complete search history.

(56) References Cited

U.S. PATENT DOCUMENTS

| | | | |
|---|---|---|---|
| 7,620,305 B2 | 11/2009 | Noji | |
| 2001/0004420 A1* | 6/2001 | Kuwana et al. | 396/55 |
| 2006/0033818 A1* | 2/2006 | Wada et al. | 348/208.11 |
| 2006/0257129 A1* | 11/2006 | Shibatani | 396/55 |
| 2007/0297780 A1* | 12/2007 | Enomoto | 396/55 |
| 2008/0231955 A1 | 9/2008 | Otsuka | |

FOREIGN PATENT DOCUMENTS

| | | |
|---|---|---|
| JP | 2006106177(A) | 4/2006 |
| JP | 2007233214 A | 9/2007 |
| JP | 2008122531 (A) | 5/2008 |
| JP | 2008233526 A | 10/2008 |

* cited by examiner

*Primary Examiner* — Trung Diep
(74) *Attorney, Agent, or Firm* — Jacobson Holman PLLC (57) ABSTRACT

To provide an anti-vibration actuator capable of obtaining a large drive force while avoiding an increase in size. An anti-vibration actuator (10) for moving an image-stabilizing lens (16) within a plane perpendicular to the optical axis thereof, including a fixed portion (12); a movable portion (14) to which the image-stabilizing lens is attached; a movable portion support means (18) for supporting the movable portion to permit translational and rotational movement within a plane parallel to the fixed portion; and first drive means (20a, 22a), second drive means (20b, 22b), and third drive means (20c, 22c) respectively disposed around the image-stabilizing lens for driving the movable portion relative to the fixed portion; whereby the drive force which can be generated by the third drive means differs from the drive forces which can be generated by the first and second drive means.

12 Claims, 5 Drawing Sheets

ANTI-VIBRATION ACTUATOR, AND LENS UNIT AND CAMERA EQUIPPED WITH SAME

BACKGROUND OF THE INVENTION

1. Field of the Invention

The present invention relates to an anti-vibration actuator, and in particular to an anti-vibration actuator and lens unit and camera equipped therewith for moving an image-stabilizing lens within a plane perpendicular to the optical axis thereof.

2. Description of Related Art

Figure 6:
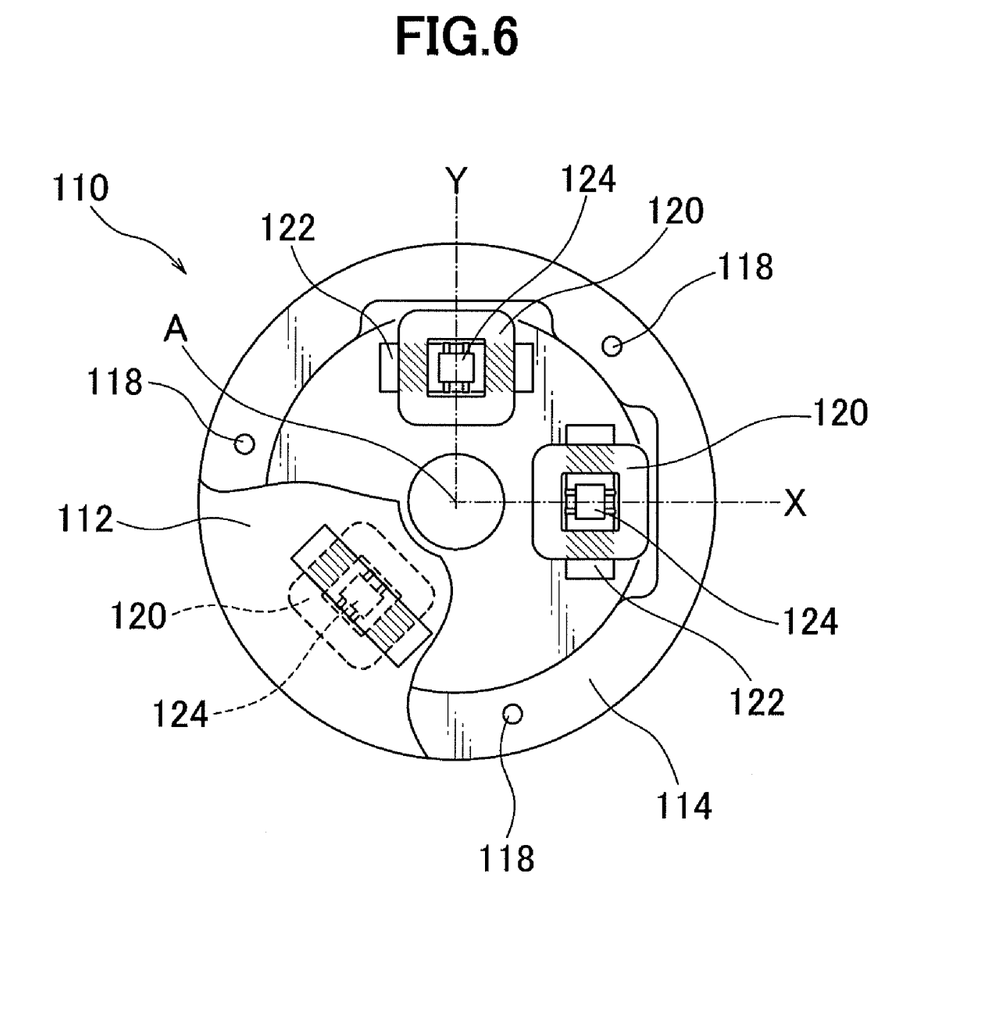
FIG. 6 A front elevation of a conventional actuator.

Published Unexamined Application JP2006-106177A describes an actuator. FIG. 6 shows the overall structure of this actuator. As shown in FIG. 6, an actuator 110 is furnished with a fixed portion 112 and a movable portion 114; the movable portion 114 is supported by three steel balls 118 to be translationally and rotationally movable with respect to the fixed portion 112. The movable portion 114 is driven by three linear motors comprising three sets of drive coils 120 and drive magnets 122.

The lines of action of the drive forces generated by these three actuators are respectively directed in the circumferential direction of a circle centered on the optical axis A of the image-stabilizing lens. Hall elements 124 for detecting the position of each of the mutually opposing drive magnets 122 are disposed on the inside of each of the drive coils 120.

In the actuator 110, rotation of the movable portion 114 is not restricted by a guide means or the like, but translational movement of the movable portion 114 is achieved by driving with the three linear motors in coordination. In addition, rotational movement of the movable portion is enabled by control of the three linear motors.

Thus an actuator not furnished with a guide means for restricting rotation of the movable portion has the advantages of a simple mechanism to support the movable portion, and of allowing rotational movement of the movable portion.

Published Unexamined Application JP2008-122531A describes an image blurring compensation device. This image blurring compensation device is furnished with 2 linear motors, and the lines of action of the drive forces generated by these 2 linear motors are respectively directed in the radial direction of a circle centered on image-stabilizing lens optical axis A.

However, the actuator described in Published Unexamined Application 2006-106177 had the problem that to increase the drive force generated by the linear motors required increasing the outside diameter of the actuator. I.e., the drive force generated by each of the linear motors was produced by the magnetic flux generated by the drive magnets 122 and the interaction of currents flowing in the shaded portion of each of the drive coils 120 of FIG. 6. It was therefore necessary to enlarge the shaded portion of each of the drive coils 120 in order to increase the drive force generated by each of the linear motors. Extending the shaded portion of each drive coil 120 requires extending each drive coil in the radial direction of the circle centered on the optical axis, creating the problem of an expanded outer diameter of the actuator as a whole.

In the actuator described in Published Unexamined Application JP2008-122531A, on the other hand, the lines of action of the drive force generated by the linear motors are directed in the radial direction of the circle, therefore the drive force can be increased by expanding each of the drive coils in the circumferential direction. Hence, in this type of actuator, an increase in drive force does not directly lead to enlargement of the actuator.

In the actuator described in Published Unexamined Application JP2008-122531A, however, the drive force from each of the linear motors is radially directed, resulting in the problem that rotational movement of the image-stabilizing lens cannot be directly controlled. This leads to an unnecessary rotational movement of the image-stabilizing lens accompanying translational movement of the image-stabilizing lens, thereby decreasing blur compensation accuracy.

BRIEF SUMMARY OF THE INVENTION

The present invention therefore has the object of providing an anti-vibration actuator and lens unit and camera furnished therewith capable of obtaining a high drive force while avoiding enlargement of the device.

The present invention has the further object of providing an anti-vibration actuator and lens unit and camera furnished therewith capable of effectively suppressing unnecessary rotational movement of the image-stabilizing lens.

In order to resolve the problems described above, the present invention is an anti-vibration actuator for moving an image-stabilizing lens within a plane perpendicular to the optical axis thereof, comprising: a fixed portion; a movable portion to which the image-stabilizing lens is attached; a movable portion support means for supporting the movable portion to permit rotational and translational movement within a plane parallel to the fixed portion; and a first drive means, a second drive means, and a third drive means respectively disposed around the image-stabilizing lens for driving the movable portion relative to the fixed portion; whereby the drive force which can be generated by the third drive means differs from the drive forces which can be generated by the first and second drive means.

In the present invention thus constituted, the movable portion to which the image-stabilizing lens is attached is supported by the movable portion support means to allow translational movement and rotational movement within a plane parallel to the fixed portion. The first drive means, the second drive means, and the third drive means are respectively disposed around the image-stabilizing lens, and the movable portion is driven relative to the fixed portion. The third drive means is configured to be capable of generating a different drive force from that of the first and second drive means.

In the present invention thus constituted, the force which can be generated by the third drive means differs from that of the first and second drive means, therefore a larger drive force can be achieved while avoiding size enlargement by appropriately setting the drive direction and the drive force which can be generated by each of the drive means.

In the present invention the first drive means preferably generates a drive force in approximately the radial direction of a circle centered on the optical axis of an image-stabilizing lens; the second drive means preferably generates a drive force in a direction approximately perpendicular to the drive force of the first drive means; and the third drive means preferably generates a drive force in approximately the circumferential direction of a circle centered on an image-stabilizing lens.

In the present invention thus constituted, the first and second drive means generate approximately mutually perpendicular drive forces, and the third drive means generates an approximately circumferential drive force, therefore the slight rotational movement of the movable portion, which is translationally moved by the first and second drive means, can be compensated by the drive force of the third drive means, thereby effectively suppressing unnecessary rotational movement of the image-stabilizing lens.

In the present invention, the drive force which can be generated by the third drive means is preferably smaller than the drive force which can be generated by the first and second drive means.

In the present invention thus constituted, the drive force which can be generated by the third drive means is smaller than the drive force which can be generated by the first and second drive means, therefore the third drive means for compensating rotational movement can be compactly constructed, and the anti-vibration actuator as a whole can be reduced in size.

In the present invention, the first and second drive means are preferably respectively furnished with drive coils and drive magnets disposed in opposition thereto, and each of the drive coils in the first and second drive means is preferably formed as approximately a rectangle, in which the length in the circumferential direction of the circle centered on optical axis of the image-stabilizing lens is longer than the radial length thereof.

In the present invention thus constituted, each of the drive coils in the first and second drive means is longer in the circumferential direction than in the radial direction, thus avoiding an enlargement of the anti-vibration actuator due to the occupation by the drive coils of a large space around the image-stabilizing lens, while assuring sufficient drive force.

In the present invention, the length of the winding portion directed in the circumferential direction of the circle thereof in each of the drive coils of the first and second drive means is approximately equal to the diameter of the anti-vibration actuator.

In the present invention thus constituted, a drive force is generated by the opposition between the winding portion, directed in the circumferential direction of the drive coil, and the drive magnet, and the winding portion which generates the drive force is formed to have a length approximately equal to the diameter of the image-stabilizing lens.

The lens unit of the present invention comprises a lens barrel, an image-capturing lens disposed within this lens barrel, and the anti-vibration actuator of the present invention, attached to the lens barrel.

Furthermore, the camera of the present invention comprises the lens unit of the present invention, and a camera body to which this lens unit is attached.

The anti-vibration actuator, the lens unit furnished therewith, and the camera of the present invention can achieve a high drive force while avoiding enlargement of the device.

The anti-vibration actuator, the lens unit furnished therewith, and the camera of the present invention also enable effective suppression of unnecessary rotational movement of the image-stabilizing lens.

DETAILED DESCRIPTION OF THE INVENTION

We next discuss embodiments of the present invention, with reference to the attached drawings.

Figure 1:
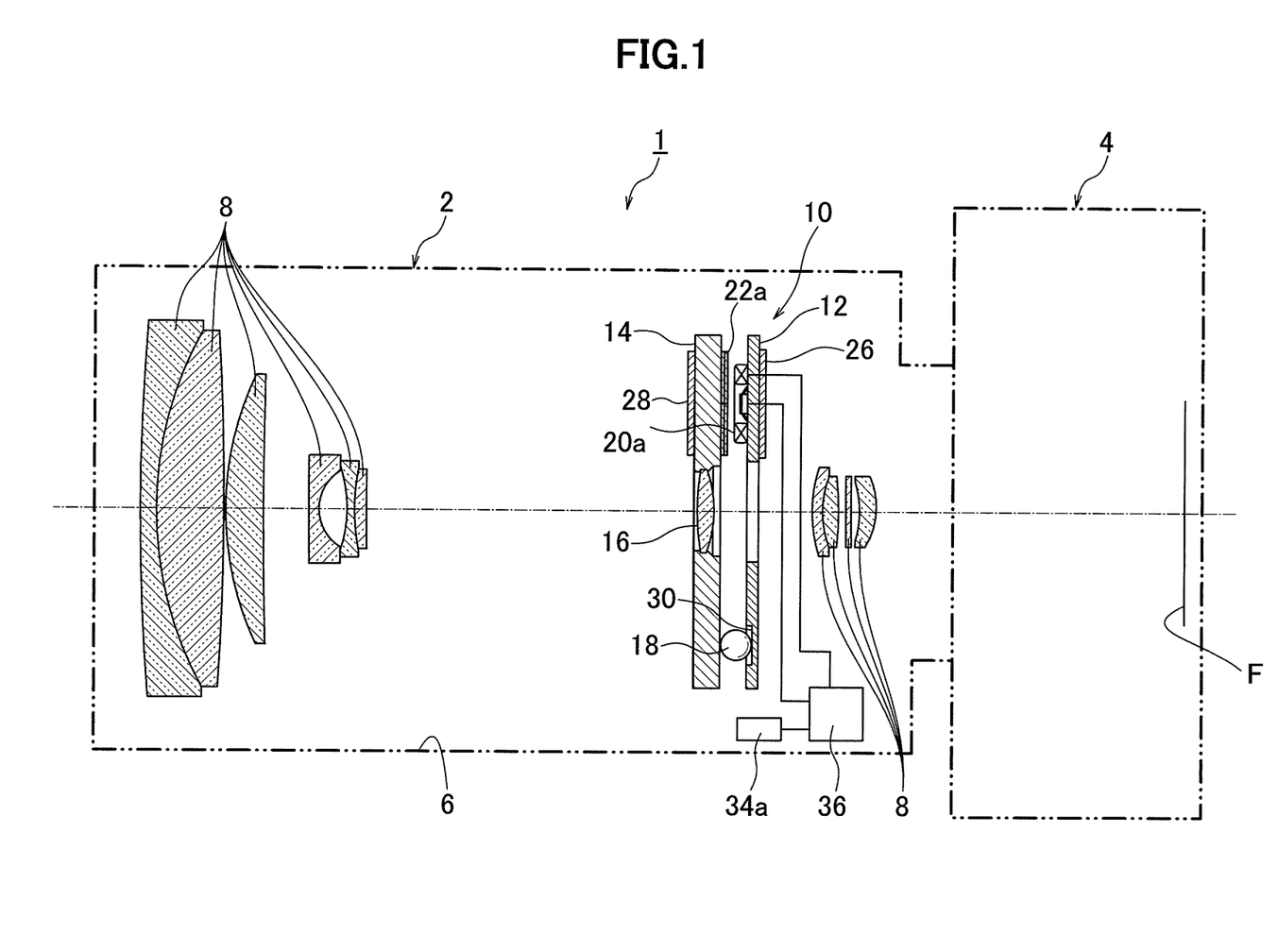
FIG. 1 A cross-section of a camera according to an embodiment of the present invention.

First, referring to FIGS. 1 through 5, we discuss a camera according to an embodiment of the present invention. FIG. 1 is a cross-section of a camera according to an embodiment of the present invention.

As shown in FIG. 1, a camera 1 in an embodiment of the present invention comprises a lens unit 2 and a camera main unit 4. The lens unit 2 is furnished with a lens barrel 6, a plurality of imaging lenses 8 disposed within the lens barrel, an anti-vibration actuator 10 for moving an image-stabilizing lens 16 within a predetermined plane, and gyros 34a and 34b (only 34a is shown in FIG. 1) serving as vibration detection means for detecting vibration in the lens barrel 6.

In the camera 1 of the embodiment of the present invention, vibration is detected by the gyros 34a and 34b; the anti-vibration actuator 10 is activated based on detected vibration, thereby moving the image-stabilizing lens 16 to stabilize the image focused on the film surface F inside the camera main unit. In the present embodiment, piezoelectric gyros are used for the gyros 34a and 34b. Note that in the present embodiment, the image-stabilizing lens 16 comprises a single lens, but the lens used to stabilize the image may also be a lens set of multiple lenses. In this Specification, the term "image-stabilizing lens" includes both single lenses and lens sets for stabilizing an image.

The lens unit 2 is attached to the camera main unit 4 and is constituted to form an image of incident light on the film surface F.

The approximately cylindrical lens barrel 6 holds within it multiple imaging lenses 8; focus can be adjusted by moving a portion of those imaging lenses 8.

Figure 2:
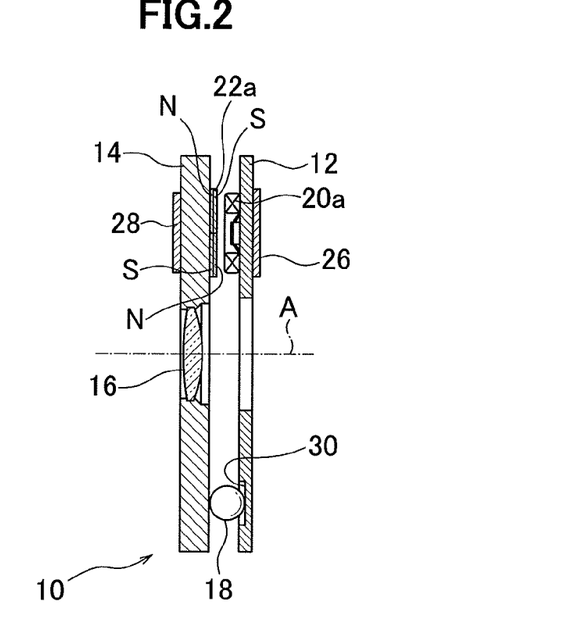
FIG. 2 A side elevation cross-section of an anti-vibration actuator provided in a camera according to an embodiment of the present invention.
Figure 3:
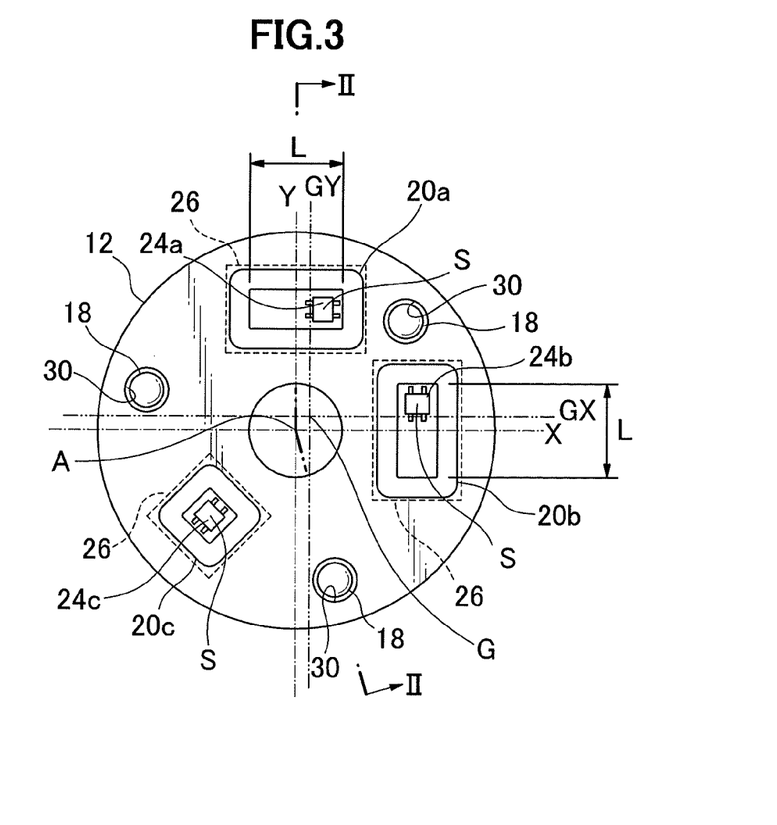
FIG. 3 A front elevation showing the anti-vibration actuator with the movable portion removed.
Figure 4:
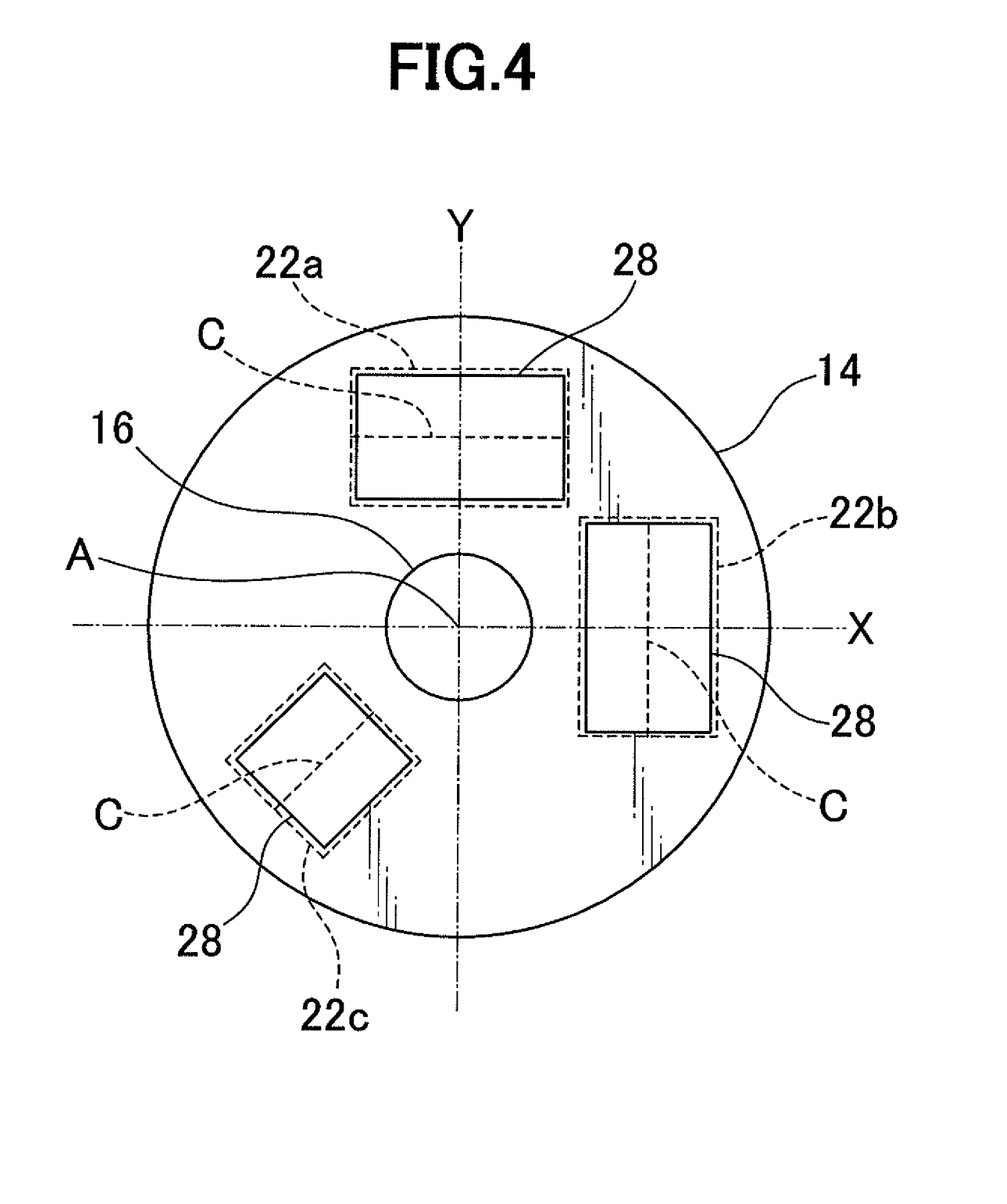
FIG. 4 A front elevation of the anti-vibration actuator movable portion.

Next, referring to FIGS. 2 through 4, we discuss the anti-vibration actuator 10. FIG. 2 is a side view section of the anti-vibration actuator 10. FIG. 3 is a front elevation showing the anti-vibration actuator 10 with the movable portion removed; FIG. 4 is a front elevation of the anti-vibration actuator 10 movable portion. Note that FIG. 2 is a cross-section showing the anti-vibration actuator 10 in cross section along line II-II in FIG. 3.

As shown in FIGS. 2 through 4, the anti-vibration actuator 10 comprises a fixed plate 12 serving as a fixed portion, affixed within the lens barrel 6; a moving frame 14 serving as the movable portion thereof, supported so as to be translationally and rotationally movable with respect to the fixed plate 12; and three steel balls 18 serving as movable portion support means for supporting the moving frame 14. In addition, the anti-vibration actuator 10 comprises a first drive coil 20a, a second drive coil 20b, and a third drive coil 20c, each attached to the fixed plate 12; a first drive magnet 22a, a second drive magnet 22b, and a third drive magnet 22c, each attached at positions respectively corresponding to each of the drive coils 20a, 20b, and 20c; and a first magnetic sensor 24a, a second magnetic sensor 24b, and a third magnetic sensor 24c, respectively serving as the first, second, and third position detection elements, disposed within each of the drive coils 20a, 20b, and 20c.

The anti-vibration actuator 10 comprises: three pull-in yokes 26 attached to the rear side of the fixed plate 12 for pulling in the moving frame 14 to the fixed plate 12 using the magnetic force of each of the drive magnets, and a back yoke 28 attached to the opposite side of each of the drive magnets to effectively direct the magnetic force of each of the drive magnets toward the fixed plate 12. Note that the first drive coil 20a, the second drive coil 20b, and the third drive coil 20c, as well as the first drive magnet 22a, the second drive magnet 22b, and the third drive magnet 22c, attached in corresponding positions thereto, form the respective first, second, and third drive means for driving the moving frame 14 relative to the fixed plate 12.

Furthermore, as shown in FIG. 1, the anti-vibration actuator 10 comprises a controller 36 serving as a control section for controlling the current sourced to the first, second, and third drive coils 20a, 20b, and 20c based on vibration detected by the gyros 34a and 34b, and on moving frame 14 position information detected by the first, second, and third magnetic sensors 24a, 24b, and 24c.

The anti-vibration actuator 10 moves the moving frame 14 translationally within a plane parallel to the film plane F relative to the fixed plate 12 attached to the lens barrel 6; by this means the image-stabilizing lens 16 attached to the moving frame 14 is driven to move in such a way that no blurring of the image focused on the film plane F occurs even if the lens barrel 6 vibrates.

The fixed plate 12 is approximately doughnut-shaped, and the first, second and third drive coils 20a, 20b, and 20c are disposed thereon. As shown in FIG. 3, these three drive coils are disposed in such a way that their centers are respectively disposed on a circle centered on the optical axis of the lens unit 2. In the present embodiment, the first drive coil 20a is disposed vertically above the optical axis; the second drive coil 20b is disposed in a horizontal direction relative to the optical axis; and the third drive coil 20c is disposed at a center angle of 135° relative to the first drive coil 20a and the second drive coil 20b. Therefore the center angle between the first drive coil 20a and the second drive coil 20b is 90°, the center angle between the second drive coil 20b and the third drive coil 20c is 135°, and the center angle between the drive coils 20c and 20a is 135°.

The first, second, and third drive coils 20a, 20b, and 20c are respectively wound so that their windings form a rectangle with rounded corners. The first and second drive coils 20a and 20b are approximately rectangular, disposed so that center lines bisecting the long sides thereof respectively lie on the Y axis and X axis. In other words, in the first and second drive coils 20a and 20b, the length in the circumferential direction of a circle centered on optical axis A is longer than the length in the radial direction, and the long sides thereof are oriented in the circumferential direction of the circle. The third drive coil 20c is smaller than the first and second drive coils, and is approximately rectangular, disposed such that the centerline bisecting its short sides is oriented to face in the radial direction of a circle centered on optical axis A.

As shown in FIG. 3, the first and second drive coils 20a and 20b are configured so that their long sides, which are of length L of the winding portion in the circumferential direction, are essentially the same as the diameter of the image-stabilizing lens 16. By expanding the length L of the winding portion in the circumferential direction of the first and second drive coils to be approximately the same as the diameter of the image-stabilizing lens 16, the portion opposing the drive magnet, which generates drive force, can be enlarged. This enables sufficient drive force to be obtained. When the length of the first and second drive coils in the circumferential direction is compared to the size of the image-stabilizing lens 16, there is no unreasonable enlargement of the overall size of the anti-vibration actuator 10, so long as that length is approximately equal to the diameter of the image-stabilizing lens 16. Therefore enlargement of the anti-vibration actuator can be avoided and a large drive force secured by adopting a length L approximately equal to the outside diameter of the image-stabilizing lens 16 for the winding portion in the circumferential direction of the first and second coils.

The moving frame 14 has an approximately doughnut shaped form, and is disposed in parallel to the fixed plate 12 to overlap the fixed plate 12. An image-stabilizing lens 16 is attached at the center opening of the moving frame 14. First, second, and third drive magnets 22a, 22b, and 22c are respectively disposed at positions corresponding to the first, second, and third drive coils 20a, 20b, and 20c on the circumference of the moving frame 14. The first and second drive magnets 22a and 22b are approximately rectangular and are disposed so that the centerlines bisecting their short sides lie on the Y axis and X axis respectively. The first and second drive magnets 22a and 22b are magnetized so the centerline bisecting the long sides thereof forms a magnetized field line. The third drive coil 20c is approximately rectangular and is smaller than the second drive magnet, and is disposed so that the centerline bisecting its long sides matches the radial direction of the circle. The third drive magnet 22c is magnetized so that the centerline bisecting the long sides thereof forms a magnetized field line. In other words, the first and second drive magnets 22a and 22b are disposed in such a way that their lines of magnetization are oriented circumferentially around a circle centered on optical access A, while the third drive magnet 22c is disposed so that the line of magnetization is oriented in the radial direction of the circle.

Note that in the present embodiment the center of gravity of the movable portion which includes the moving frame 14, the image-stabilizing lens 16, and the first, second, and third drive magnets 22a, 22b, and 22c, is positioned at point G in FIG. 3.

As shown in FIGS. 2 and 3, the three steel balls 18 are sandwiched between the fixed frame 12 and the moving frame 14, and are respectively disposed on a circle centered on optical axis A, each separated by a center angle of 120°. Each of the steel balls 18 is disposed in an indentation 34 corresponding to the steel balls 18 on the fixed frame 12, and is thus prevented from falling out. Also, as will be discussed below, the moving frame 14 is pulled in by a drive magnet to the fixed plate 12, therefore the steel balls 18 are sandwiched between the fixed plate 12 and the moving frame 14. The moving frame 14 is thus supported on a plane parallel to the fixed plate 12, and each of the steel balls 18 is sandwiched as it rolls, thereby allowing for translational and rotational movement of the moving frame 14 in any desired direction with respect to the fixed plate 12.

While steel spherical bodies are used for the steel balls 18 in the present embodiment, the steel balls 18 do not necessarily have to be spherical bodies. Any desired steel balls 18 may be used so long as the portion thereof which contacts the fixed plate 12 and the moving frame 14 during operation of the anti-vibration actuator 10 has an approximately spherical surface. In the present Specification, this form is referred to as a spherical body. Spherical bodies may also be constituted from metals other than steel, resin, and the like.

Back yokes 28 are approximately rectangular, and are respectively attached on the sides of the moving frame 14 to which drive magnets are not attached, and are disposed at positions corresponding to each of the respective drive magnets. These back yokes 28 efficiently direct the magnetic flux of each of the drive magnets toward the fixed plate 12.

Pull-in yokes 26 are approximately rectangular, and are respectively attached on the sides of the fixed plate 12 to which drive coils are not attached, and are disposed in positions corresponding to each of the respective drive coils. The moving frame 14 is pulled into the fixed plate 12 by the magnetic force exerted by each of the drive magnets on the pull-in yokes 26.

As shown in FIG. 2, the magnetization boundary line C of the first drive magnet 22a is positioned to pass through the center point of each of the short sides of the rectangular first drive magnet 22a, while polarity also changes in the thickness direction of the first drive magnet 22a. In the present embodiment, the lower left corner in FIG. 2 is an S pole, the lower right an N pole, the upper left an N pole, and the upper right an S pole. The second drive magnet 22b is similarly magnetized, and is attached to the moving frame 14 at an angle rotated by 90° (FIG. 4). Note that in the present Specification, the magnetization boundary line C refers to the line connecting the points at which the S pole changes to the N pole between the two ends of the drive magnet when these are respectively the S pole and the N pole.

By being thus magnetized, the first and second drive magnets 22a and 22b exert magnetism on primarily the long side portions of the rectangular first and second drive coils 20a and 20b. Therefore when a current flows in the first drive coil 20a, a drive force is generated in the vertical direction along the Y axis in the interval with the first drive magnet 22a, and when a current flows a second drive coil 20b, a drive force is generated in the horizontal direction axis in the interval with the second drive magnet 22b.

The line of action of the drive force from the first drive means constituted by the first drive coil 20a and the first drive magnet 22a is directed in approximately the radial direction of the image-stabilizing lens 16, while the line of action of the drive force from the second drive means constituted by the second drive coil 20b and the second drive magnet 22b is approximately perpendicular to the line of action of the drive force from the first drive means, and is directed in approximately the radial direction of the image-stabilizing lens 16.

At the same time, as shown in FIG. 4, the third drive magnet 22c is disposed so that a magnetization boundary line C faces in the radial direction of a circle centered on the optical axis A. When magnetism from the third drive magnet 22c is exerted on the portion of the third drive coil 20c directed in the radial direction, a drive force is generated by a flow of current in the third drive coil 20c. This drive force acts in the circumferential direction of a circle centered on optical axis A in the interval with the third drive magnet 22c. The third drive coil 20c and third drive magnet 22c which make up the third drive means are constituted to be smaller than the first and second drive coils and than the first and second drive magnets, therefore the drive force generated by the third drive means for the same current flowing in a drive coil is smaller than the drive force generated by the first and second drive means.

In the present embodiment, the center of gravity of the anti-vibration actuator 10 movable portion (the moving frame 14, the image-stabilizing lens 16, and each of the drive magnets) is positioned approximately on the optical axis A, therefore the moving frame 14 is translationally moved in an approximately accurate manner in the vertical direction by the drive force of the first drive means, which is radially oriented in a circle centered on optical axis A. Similarly, the moving frame 14 is translationally moved in an approximately accurate manner in the horizontal direction by the drive force of the second drive means. The third drive means is provided to suppress the very small rotational movement generated in conjunction with the translational movement of moving frame 14, therefore the drive force required to be generated by the third drive means is smaller than that of the first and second drive means.

As shown in FIGS. 2 and 3, a first magnetic sensor 24a, a second magnetic sensor 24b, and a third magnetic sensor 24c are respectively disposed on the inside of each drive coil. The first, second, and third magnetic sensors 24a, 24b, and 24c are constituted to measure the position of the moving frame 14 with respect to the fixed plate 12 in a direction parallel to the line of action of the drive force generated by the first, second, and third drive means. When the moving frame 14 is in the center position, the magnetic sensors are disposed such that their sensitivity center point S is positioned on the magnetic center axis line C of each of the drive magnets 22. In the present embodiment, Hall elements are used as the magnetic sensors.

The output signal from the magnetic sensor is 0 when the magnetic sensor sensitivity center point S is on the drive magnet magnetization boundary line C, and the output signal from the magnetic sensor changes when the drive magnet moves and the magnetic sensor sensitivity center point S strays from the drive magnet magnetization boundary line C. In normal operation of the anti-vibration actuator 10, in which the amount of movement of the drive magnets is extremely small, a signal approximately proportional to the distance moved in the direction perpendicular to the drive magnet magnetization boundary line C is output.

Therefore the first magnetic sensor 24a outputs a signal which is approximately proportional to the amount of translational movement by the moving frame 14 in the Y axis direction, and the second magnetic sensor 24b outputs a signal which is approximately proportional to the amount of translational movement by the moving frame 14 in the X axis direction. The third magnetic sensor 24c outputs a signal which includes a large component of the rotational movement of the moving frame 14. The position to which the moving frame 14 has translationally and rotationally moved with respect to the fixed frame 12 can thus be identified based on the signals detected by the first, second, and third magnetic sensors 24a, 24b, and 24c.

Figure 5:
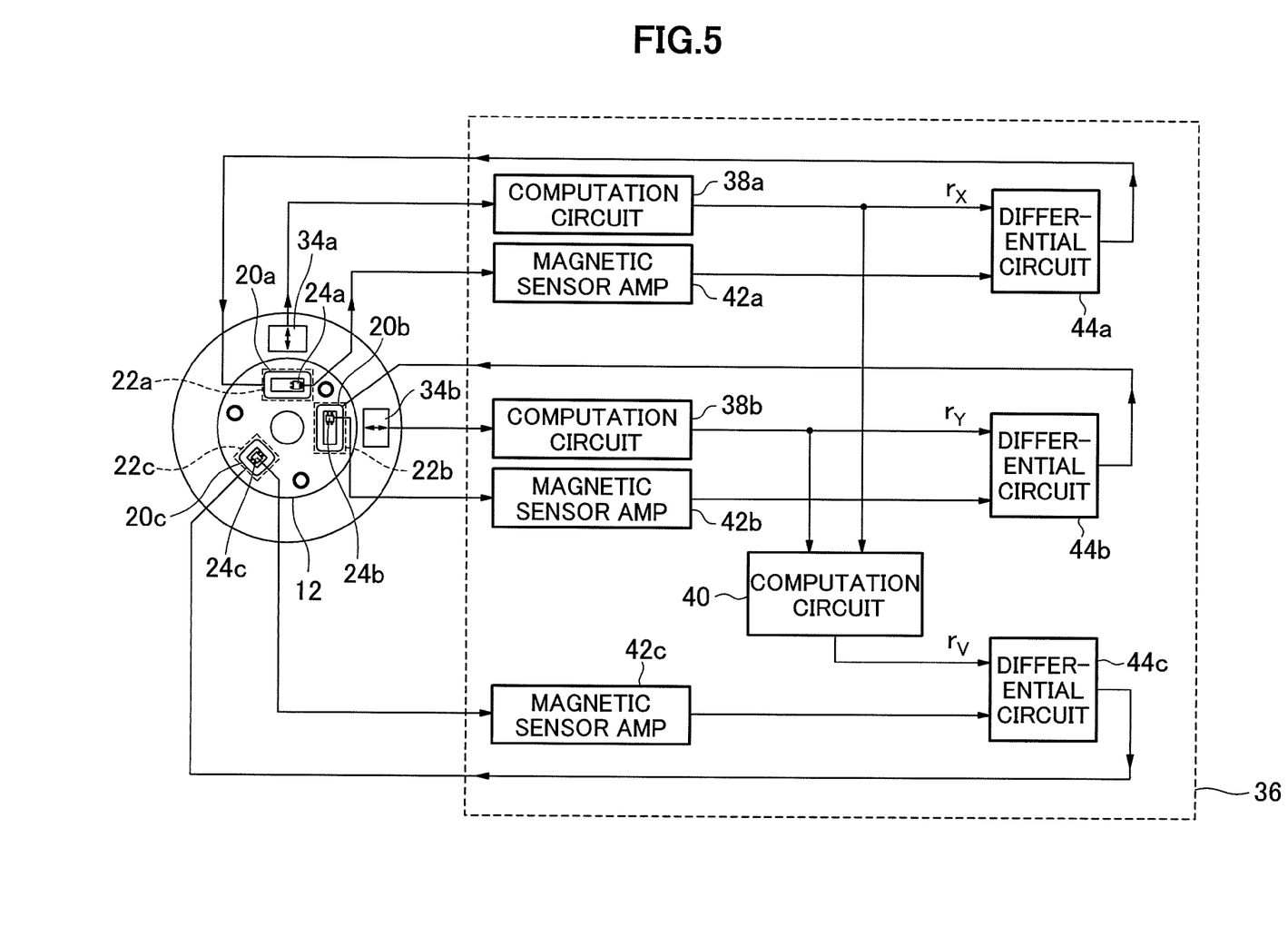
FIG. 5 A block diagram showing signal processing in the controller.

Next, referring to FIG. 5, we discuss control of the anti-vibration actuator 10. FIG. 5 is a block diagram showing signal processing occurring in the controller 36. As shown in FIG. 5, vibration of the lens unit 2 is detected from moment to moment by the gyros 34a and 34b, and is input to computation circuits 38a and 38b built into the controller 36. In the present embodiment, the gyro 34a is constituted to detect the angular acceleration of the pitching movement of the lens unit 2, and the gyro 34b is constituted to detect the angular acceleration of the yaw movement thereof.

The computation circuits 38a and 38b, based on angular velocities input from moment to moment from the gyros 34a and 34b, generate lens position command signals to command by a time series the position to which the image-stabilizing lens 16 should be moved. In other words, the computation circuit 38a time-integrates the angular velocity of the pitching motion detected by the gyro 34a, generating the vertical component for the lens position command signal by adding in a predetermined correction signal. Similarly, the computation circuit 38b generates the horizontal component of the lens position command signal based on a yawing motion angular velocity detected by the gyro 34b. By moving the image-stabilizing lens 16 from moment to moment in response to lens position command signals obtained in this manner, an image focused on the film plane F inside the camera main unit 4 can be stabilized without blurring the image, even if the lens unit 2 vibrates during a photographic exposure.

The controller 36 controls the current sourced to the first, second, and third drive coils 20a, 20b, and 20c so that the image-stabilizing lens 16 is moved to a position commanded by the lens position command signal generated by the computational circuits 38a and 38b.

At the same time, the amount of movement in the vertical direction of the first drive magnet 22a relative to the first drive coil 20a as measured by the first magnetic sensor 24a is amplified by a predetermined factor by a magnetic sensor amp 42a. A differential circuit 44a sources to the first drive coil 20a a current proportional to the difference between the vertical component of the lens position command signal output from the computational circuit 38a and the amount of vertical movement of the first drive magnet 22a relative to the first drive coil 20a output from the magnetic sensor amp 42a. Current thus ceases to flow to the first drive coil 20a, and the drive force operating on the first drive magnet 22a goes to 0 when there ceases to be a difference between the vertical component of the lens position commanded by the lens position command signal and the output from the magnetic sensor amp 42a.

Similarly, the amount of horizontal movement of the second drive magnet 22 relative to the second drive coil 20b, as measured by the second magnetic sensor 24b, is amplified by a predetermined factor by a magnetic sensor amp 42b. A differential circuit 44b sources a current to the first drive coil 20b which is proportional to the difference between the horizontal component of the lens position command signal output from the computational circuit 38b and the amount of horizontal movement of the second drive magnet 22b relative to the first drive coil 20b output from the magnetic sensor amp 42b. Therefore current ceases to flow to the first drive coil 20a and the drive force operating on the second drive magnet 22b goes to 0 when there ceases to be a difference between the horizontal component of the lens position commanded by the lens position command signal and the output from the magnetic sensor amp 42b.

The amount of movement of the third drive magnet 22c relative to the third drive coil 20c as measured by the third magnetic sensor 24c is amplified by a predetermined factor using a magnetic sensor amp 42c. At the same time, the computation circuit 40 generates a predetermined signal based on the vertical component of the lens position command signal output from the computation circuit 38a and the horizontal component of the lens position command signal output from the computation circuit 38b. This signal indicates the position to which the third drive magnet 22c is to move relative to the third drive coil 20c when the moving frame 14 has been moved translationally to a position directed by the lens position command signal; the signal can be obtained geometrically based on each of the magnetic sensor positions.

If the second drive magnet 22b has been moved to a horizontal position commanded by the lens position command signal, the first drive magnet 22a has been moved to a vertical position commanded by the lens position command signal, and the moving frame 14 has been accurately translationally moved, the output signals from the magnetic sensor amp 42c and the computation circuit 40 will match, therefore current will cease to flow to the third drive coil 20c, and the drive force acting on the third drive magnet 22c will become 0.

Even in cases where the first and second drive magnets 22a and 22b are moved to positions commanded by the lens position command signal, the magnetic sensor amp 42c output signal and the computation circuit 40 output signal will not match if the moving frame 14 has been rotationally as well as translationally moved, so current will flow to the third drive coil 20c. The current flowing to the third drive coil 20c causes a drive force to act on the third drive magnet 22c, which rotates the moving frame 14. Rotational movement of the moving frame 14 is thus cancelled, and the moving frame 14 moves translationally in an accurate manner. In the anti-vibration actuator 10 of the present embodiment, the rotational movement of the moving frame 14 is suppressed and the moving frame is accurately translationally moved by the combined drive forces of the first, second, and third drive means, regardless of the fact that the moving frame 14 is translationally and rotationally supported relative to the affixing plate 12 by the three steel balls 18.

Next, referring to FIGS. 1 through 5, we discuss the mode of operation of a camera 1 according to an embodiment of the present invention. First, turning the anti-shake start switch (not shown) on the camera 1 to the ON position activates the anti-vibration actuator 10 provided on the lens unit 2. The gyros 34a and 34b attached to the lens unit 2 detect vibration in a predetermined frequency band from moment to moment, outputting this signal to computation circuits 38a and 38b built into the controller 36. The gyro 34a outputs to the computation circuit 38a a signal for the angular velocity in the pitching direction of the lens unit 2, and the gyro 34b outputs to the computation circuit 38b a signal for the angular velocity in the yawing direction thereof. The computation circuit 38a performs a time integration of the input angular velocity signal, calculates a pitching angle, adds to this a predetermined correction signal, and generates a vertical lens position command signal. Similarly, the computation circuit 38b time-integrates the input angular velocity signal, calculates a yawing angle, adds to this a predetermined correction signal, and generates a horizontal lens position command signal. The image focused on the film surface F of the camera main unit 4 is stabilized by moving the image-stabilizing lens 16 from moment to moment to the positions commanded by the lens position command signal using a time series output from the calculation circuits 38a and 38b.

The vertical lens position command signal output by the computation circuit 38a is input to a differential circuit 44a, and the horizontal lens position command signal output by the computation circuit 38b is input to a differential circuit 44b. The outputs of the computation circuits 38a and 38b are input to the computation circuit 40, and the computation circuit 40 outputs a signal computed according to a predetermined relational expression, then outputs the result to a differential circuit 44c.

At the same time, the first magnetic sensor 24a disposed inside the first drive coil 20a outputs a detection signal to the magnetic sensor amp 42a, as does the second magnetic sensor 24b disposed inside the second drive coil 22 to the magnetic sensor amp 42b, and the third magnetic sensor 24c disposed inside the third drive coil 20c to the magnetic sensor amp 42c. Each of the magnetic sensor detection signals respectively amplified by the magnetic sensor amps 42a, 42b, and 42c is respectively input to the differential circuits 44a, 44b, and 44c.

The differential circuits 44a, 44b, and 44c respectively generate a voltage in response to the difference between the detection signal input from each of the magnetic sensors and the signals input from each of the computation circuits 38a, 38b, and 38c, and source to each of the drive coils a current proportional to that voltage. A magnetic field proportional to the current is generated when a current flows to each of the drive coils. The first, second, and third drive magnets 22a, 22b, and 22c, disposed to correspond respectively to the first, second, and third drive coils 20a, 20b, and 20c, receive a drive force from this magnetic field, moving the moving frame 14. When the moving frame 14 is moved by the drive force and each of the drive magnets reaches the position designated by the lens position command signal, the output of each of the actuating circuits goes to 0, and the drive force goes to 0. If the moving frame 14 strays from the position designated by the lens position command signal due to external disturbance or the like, a current is again sourced to each of the drive coils, and the moving frame 14 is returned to the position designated by the lens position command signal.

By continuous repetition of the above actions, the image-stabilizing lens 16 attached to the moving frame 14 is made to move so as to follow the lens position command signal. The image focused on the film plane F of the camera main unit 4 is thus stabilized.

In the anti-vibration actuator of the present embodiment of the invention, the drive force which can be generated by the third drive means differs from that which can be generated by the first and second drive means, therefore by appropriately setting the drive force direction of each drive means and the amount of drive force which can be generated, a large drive force can be obtained while avoiding an increase in size.

Also, in the anti-vibration actuator of the present embodiment, the first and second drive means generate approximately perpendicular drive forces, and the third drive means generates an approximately circumferential drive force, therefore for the moving frame translationally moved by the first and second drive means, the small amount of rotational movement generated can be compensated by the drive force of the third drive means, so unnecessary rotation of the image-stabilizing lens can be effectively suppressed.

In addition, in the anti-vibration actuator of the present invention, the drive force which can be generated by the third drive means is smaller than the drive force which can be generated by the first and second drive means, therefore the third drive means for compensating rotational movement can be compactly constituted, and the anti-vibration actuator as a whole can also be made compact.

Also, in the anti-vibration actuator of the present invention, the first and second drive coils are longer in the circumferential direction than in the radial direction, making it possible to prevent the drive coil from occupying a large space around the image-stabilizing lens, thereby enlarging the anti-vibration actuator.

In the anti-vibration actuator of the present invention, the winding portion directed in the circumferential direction of the drive coil is formed to a length approximately equal to the diameter of the image-stabilizing lens, thereby avoiding enlargement of the anti-vibration actuator and assuring a large drive force.

We have described above a preferred embodiment of the present invention, but various changes can be added to the above-described embodiment. In particular, in the above-described embodiment, the invention was applied to a film camera, but it may also be applied to a digital still camera, a video camera, or the like. Also, in the embodiment described above, the drive coil was attached to the fixed portion and the drive magnet was attached to the movable portion, but the drive coil can also be attached to the movable portion, and the drive magnet to the fixed portion.

The invention claimed is:

1. An anti-vibration actuator for moving an image-stabilizing lens within a plane perpendicular to the optical axis thereof, comprising:
   a fixed portion;
   a movable portion to which the image-stabilizing lens is attached;
   movable portion support means for supporting the movable portion so as to permit rotational and translational movement within a plane parallel to the fixed portion; and
   first drive means, second drive means, and third drive means for generating driving forces in different directions respectively disposed around the image-stabilizing lens for driving the movable portion relative to the fixed portion;
   wherein the first drive means generates a drive force in approximately the radial direction of a circle centered on the optical axis of an image-stabilizing lens; the second drive means generates a drive force in a direction approximately perpendicular to the drive force of the first drive means; and the third drive means generates a drive force in approximately the circumferential direction of a circle centered on the optical axis of the image-stabilizing lens; and
   wherein the drive force which can be generated by the third drive means is smaller than the drive forces which can be generated by the first and second drive means.

2. A lens unit comprising:
   a lens barrel;
   a photographic lens disposed within the lens barrel; and
   the anti-vibration actuator according to claim 1, attached to the lens barrel.

3. A camera comprising:
   the lens unit according to claim 2; and
   a camera body attached to the lens unit.

4. An anti-vibration actuator for moving an image-stabilizing lens within a plane perpendicular to the optical axis thereof, comprising:
   a fixed portion;
   a movable portion to which the image-stabilizing lens is attached;
   movable portion support means for supporting the movable portion so as to permit rotational and translational movement within a plane parallel to the fixed portion; and
   first drive means, second drive means, and third drive means for generating driving forces in different directions respectively disposed around the image-stabilizing lens for driving the movable portion relative to the fixed portion;
   wherein the drive force which can be generated by the third drive means differs from the drive forces which can be generated by the first and second drive means;
   wherein the first drive means generates a drive force in approximately the radial direction of a circle centered on the optical axis of an image-stabilizing lens; the second drive means generates a drive force in a direction approximately perpendicular to the drive force of the first drive means; and the third drive means generates a drive force in approximately the circumferential direction of a circle centered on the optical axis of the image-stabilizing lens; and
   wherein the first and second drive means are respectively furnished with a drive coil and a drive magnet disposed in opposition thereto, and in each of the drive coils on the first and second drive means, the length in the circumferential direction of a circle centered on the optical axis of the image-stabilizing lens is longer than the length in the radial direction thereof, and is formed as approximately a rectangle.

5. The anti-vibration actuator according to claim 4, wherein for each of the drive coils in the first and second drive means, the length of the winding portion directed in the circumferential direction is approximately equal to the diameter of the image-stabilizing lens.

6. An anti-vibration actuator for moving an image-stabilizing lens within a plane perpendicular to the optical axis thereof, comprising: a fixed portion; a movable portion to which the image-stabilizing lens is attached; movable portion support means for supporting the movable portion so as to permit rotational and translational movement within a plane parallel to the fixed portion; and first drive means, second drive means, and third drive means respectively disposed around the image-stabilizing lens for driving the movable portion relative to the fixed portion; wherein the first drive means generates a drive force in approximately the radial direction of a circle centered on the optical axis of an image-stabilizing lens; the second drive means generates a drive force in a direction approximately perpendicular to the drive force of the first drive means; and the third drive means generates a drive force in approximately the circumferential direction of a circle centered on the optical axis of the image-stabilizing lens; and wherein the drive force which can be generated by the third drive means is smaller than the drive forces which can be generated by the first and second drive means.

7. A lens unit comprising:
a lens barrel;
a photographic lens disposed within the lens barrel; and
the anti-vibration actuator according to claim 6, attached to the lens barrel.

8. A camera comprising:
the lens unit according to claim 7; and
a camera body attached to the lens unit.

9. An anti-vibration actuator for moving an image-stabilizing lens within a plane perpendicular to the optical axis thereof, comprising:
a fixed portion;
a movable portion to which the image-stabilizing lens is attached;
movable portion support means for supporting the movable portion so as to permit rotational and translational movement within a plane parallel to the fixed portion; and
first drive means, second drive means, and third drive means respectively disposed around the image-stabilizing lens for driving the movable portion relative to the fixed portion;
wherein the first drive means generates a drive force in approximately the radial direction of a circle centered on the optical axis of an image-stabilizing lens; the second drive means generates a drive force in a direction approximately perpendicular to the drive force of the first drive means; and the third drive means generates a drive force in approximately the circumferential direction of a circle centered on the optical axis of the image-stabilizing lens; and
wherein the first and second drive means are respectively furnished with a drive coil and a drive magnet disposed in opposition thereto, and in each of the drive coils on the first and second drive means, the length in the circumferential direction of a circle centered on the optical axis of the image-stabilizing lens is longer than the length in the radial direction thereof, and is formed as approximately a rectangle.

10. The anti-vibration actuator according to claim 9, wherein for each of the drive coils in the first and second drive means, the length of the winding portion directed in the circumferential direction is approximately equal to the diameter of the image-stabilizing lens.

11. A lens unit comprising:
a lens barrel;
a photographic lens disposed within the lens barrel; and
the anti-vibration actuator according to claim 9, attached to the lens barrel.

12. A camera comprising:
the lens unit according to claim 11; and
a camera body attached to the lens unit.

* * * * *